United States Patent
Diep et al.

(10) Patent No.: US 6,963,543 B2
(45) Date of Patent: Nov. 8, 2005

(54) METHOD AND SYSTEM FOR GROUP CALL SERVICE

(75) Inventors: David Diep, Sevran (FR); Francesco Grilli, Irvine, CA (US)

(73) Assignee: Qualcomm Incorporated, San Diego, CA (US)

( * ) Notice: Subject to any disclaimer, the term of this patent is extended or adjusted under 35 U.S.C. 154(b) by 806 days.

(21) Appl. No.: 09/895,667

(22) Filed: Jun. 29, 2001

(65) Prior Publication Data

US 2003/0048764 A1 Mar. 13, 2003

(51) Int. Cl.$^7$ ................................................. H04L 12/16
(52) U.S. Cl. ........................ 370/261; 370/335; 455/517
(58) Field of Search ................................ 370/260–263, 370/318, 329, 335, 342; 455/517–519

(56) References Cited

U.S. PATENT DOCUMENTS

| | | | | |
|---|---|---|---|---|
| 5,222,248 A | * | 6/1993 | McDonald et al. | 455/509 |
| 5,530,914 A | * | 6/1996 | McPheters | 455/518 |
| 5,594,948 A | * | 1/1997 | Talarmo et al. | 455/518 |
| 5,722,074 A | * | 2/1998 | Muszynski | 370/335 |
| 5,729,536 A | * | 3/1998 | Doshi et al. | 370/335 |
| 5,809,018 A | * | 9/1998 | Lehmusto | 455/519 |
| 5,835,860 A | * | 11/1998 | Diachina | 455/519 |
| 5,850,607 A | * | 12/1998 | Muszynski | 455/442 |
| 5,936,948 A | * | 8/1999 | Sicher | 370/345 |
| 5,970,417 A | * | 10/1999 | Toyryla et al. | 455/519 |
| 6,178,166 B1 | | 1/2001 | Wilson et al. | |
| 6,278,697 B1 | * | 8/2001 | Brody et al. | 370/466 |

FOREIGN PATENT DOCUMENTS

| | | |
|---|---|---|
| EP | 1107560 | 6/2001 |
| GB | 2290196 | 12/1995 |
| WO | 0038439 | 6/2000 |
| WO | 0137453 | 5/2001 |

OTHER PUBLICATIONS

Technical Specification Group Core Network; Voice Group Call Service (VGCS)–Stage 2, *European Telecommunications Standards Institute (ETSI)*, (3GPP TS 43.68 version 4.2.1).

* cited by examiner

*Primary Examiner*—Andy Lee
(74) *Attorney, Agent, or Firm*—Philip R. Wadsworth; Thien T. Nguyen; George J. Oehling

(57) ABSTRACT

A method and system for group call services in a CDMA radio access network over a GSM-MAP or ANSI-41 core network are presented. The method and system provide for call setup, call notification, and call termination in the air interface of the CDMA radio access network. The necessary modification to the traffic and signaling channels for the CDMA radio network as well as new call flow messages are provided.

9 Claims, 10 Drawing Sheets

A- Individual notification:

↑ Notification sent by the BS containing the
⋮ mobile and the group identity

B- Group notification:

↑ Notification sent by the BS containing the
⋮ group identity only

| Step | Direction MS / BS | RR Message | Comments |
|---|---|---|---|
| 0 | ↑ | MAPCRM (Establishment cause) | MC-MAP RRC Connection Request Message |
| 1 | ↓ | ECAM (DCCH, R-FCH)* | Modified Extended Channel Assignment Message |
| 2 | ↑ | MAPIL3M [SERVICE REQUEST] | MC-MAP Initial L3 Message containing the GSM-MAP message SERVICE REQUEST |
| 3 | ↓ | MAPL3M [AUTHENTIFICATION REQUEST] | MC-MAP L3 Message containing the GSM-MAP message AUTHENTIFICATION REQUEST |
| 4 | ↑ | MAPL3M [AUTHENTIFICATION RESPONSE] | MC-MAP L3 Message containing the GSM-MAP message AUTHENTIFICATION RESPONSE |
| 5 | ↑ | MAPL3M [SETUP] | MC-MAP L3 Message containing the GSM-MAP message SETUP |
| 6 | ↓ | Service Connect Message | Existing message over the air |
| 7 | ↑ | Service connect Completion Message | Existing message over the air |
| 8 | ↓ | MAPL3M [CONNECT] | MC-MAP L3 Message containing the GSM-MAP message CONNECT |
| | | *Conversation proceeds* | |
| 9 | ↑ | GCS Reverse Link Release | New message sent by the talker to release the reverse link resource for voice (power controlled R-FCH) |
| 10 | ↓ | GCS Reverse Link Status (Free)** | New message sent by the base station to give the reverse link status and to indicate the broadcast channel description to the talker |

FIG. 5

| Step | Direction | | RR Message | |
|---|---|---|---|---|
| | MS | BS | | |
| 0 | → | | MAPCRM (Establishment cause) | MC-MAP RRC Connection Request Message |
| 1 | | ← | ECAM (DCCH, R-FCH)* | Modified Extended Channel Assignment Message |
| 2 | → | | MAPIL3M [IMMEDIATE SETUP] | MC-MAP Initial L3 Message containing the GSM-MAP message IMMEDIATE SETUP |
| 3 | | ← | MAPL3M [AUTHENTIFICATION REQUEST] | MC-MAP L3 Message containing the GSM-MAP message AUTHENTIFICATION REQUEST |
| 4 | → | | MAPL3M [AUTHENTIFICATION RESPONSE] | MC-MAP L3 Message containing the GSM-MAP message AUTHENTIFICATION RESPONSE |
| 5 | | ← | Service Connect Message | Existing message over the air |
| 6 | → | | Service connect Completion Message | Existing message over the air |
| 7 | | ← | MAPL3M [CONNECT] | MC-MAP L3 Message containing the GSM-MAP message CONNECT |
| | | | *Conversation proceeds* | |
| 8 | → | | GCS Reverse Link Release | New message sent by the talker to release the reverse link resource for voice (power controlled R-FCH) |
| 9 | | ← | GCS Reverse Link Status (Free)** | New message sent by the base station to give the reverse link status and to indicate the broadcast channel description to the talker |

FIG. 6

| Step | Direction | | RR Message | Comments |
|---|---|---|---|---|
| | MS | BS | | |
| 0 | ← | | General Page Message (GroupID) | Modified General Page Message |
| | | | Man-machine interface action to join the group call | |
| 1 | → | | MAPCRM (Establishment cause) | MC-MAP RRC Connection Request Message |
| 2 | ← | | ECAM (DCCH, BroadCH) | Modified Extended Channel Assignment Message |
| 3 | → | | MAPIL3M [PAGING RESPONSE] | MC-MAP Initial L3 Message containing the GSM-MAP message PAGING RESPONSE |
| 4 | ← | | Service Connect Message | Existing message over the air |
| 5 | → | | Service connect Completion Message | Existing message over the air |

FIG. 8

| Step | Direction | | RR Message | Comments |
|---|---|---|---|---|
| | MS | BS | | |
| 0 | | ← | GCS Reverse Link Status (Free)* | New message sent by the base station to give the reverse link status and to indicate the power controlled R-FCH to the potential talker |
| 1 | → | | GCS Reverse Link Access | New message sent by a listener who wants to become a talker |
| 2 | | ← | GCS Reverse Link Grant | New message sent by the base station to grant the permission to become a talker |
| 3 | → | | ACK (GCS Reverse Link Grant) | Acknowledgement of the GCS Reverse Link Grant message |
| | | | Conversation proceeds | |
| 4 | → | | GCS Reverse Link Release | New message sent by the talker to release the reverse link resource for voice (power controlled R-FCH) |
| 5 | | ← | GCS Reverse Link Status (Free)** | New message sent by the base station to give the reverse link status and to indicate the broadcast channel to the talker |

FIG. 9

| Step | Direction | | RR Message | Comments |
|---|---|---|---|---|
| | MS | BS | | |
| 0 | → | | MAPL3M [TERMINATION REQUEST] | MC-MAP L3 Message containing the GSM-MAP message TERMINATION REQUEST |
| 1 | | ← | MAPL3M [TERMINATION] | MC-MAP L3 Message containing the GSM-MAP message TERMINATION |
| 2 | | ← | Release Order | Existing message over the air |
| 3 | → | | Release Order | Existing message over the air |

FIG. 10

METHOD AND SYSTEM FOR GROUP CALL SERVICE

BACKGROUND

1. Field

The present invention relates generally to telecommunications systems, and more specifically to group call service in a code division multiple access (CDMA) radio access network over a core network.

2. Background

A class of wireless services intended for quick, efficient, one-to-one or one-to-many (group) communication has existed in various forms for many years. In general, these services have been half-duplex, where a user presses a "push-to-talk" (PTT) button placed on a phone or radio to initiate speech. Pushing the PTT button triggers a radio or a server, which indicates the user's request for the "floor." If granted the floor, or granted talker status, the talker may speak for a while, after which the talker may release the PTT button, and the listeners may request the floor. Communication is generally from one talker to a group of listeners, or just to one listener. This kind of service has traditionally been used in applications where one person, or a "dispatcher," needs to communicate to a group of people, such as field service personnel.

A key feature of these services is that communication is quick and spontaneous, usually initiated by simply pressing a PTT button without going through a typical dialing and ringing sequence. Communication in this type of service is generally very short, with individual talk spurts being generally on the order of 10 seconds or less, and conversations lasting from minutes to a whole business day, e.g. in the case of a radio taxi service.

One such service is the GSM voice group call service (VGCS), as described in the GSM system specifications such as 3GPP TS 42.068 "Voice Group Call Service (VGCS); Stage 1," 3GPP TS 42.069 "Voice Group Call Service (VGCS); Stage 2," and GSM 04.18 "Mobile radio interface layer 3 specification; Radio Resource Control Protocol". It would be desirable to incorporate such a system in CDMA networks, which are rapidly overtaking GSM systems as the network of choice due to their technological superiority.

There is a need in the art for offering group call service (GCS) in CDMA systems.

SUMMARY

One aspect of the invention is directed to a method and system for providing group call service in a communication network that includes a core network and a CDMA radio access network. The method and system provide for sending an indication about status of a reverse link channel to a number of members of a group, receiving a request for the reverse link channel from a plurality of the members of the group, and granting the reverse link channel to one of the plurality of the members of the group. The core network may be based on GSM technology or on ANSI-41 technology.

Another aspect of the invention is directed to a method and system for providing group call service in a communication network that includes a core network and a CDMA radio access network. The method and system provide for transmitting traffic information from the talker to a base station, receiving the transmitted traffic information by the base station, and broadcasting the traffic information received by the base station to the number of listeners in the group. The broadcasting may include multiplexing traffic and signaling information on the same broadcast channel. The core network may be based on GSM or ANSI-41 technology.

Another aspect of the invention is directed to a method and system for providing group call service in a communication network that includes a core network and a CDMA radio access network. The method and system provide for receiving an indication from a member of a group requesting to talk to a number of members of the group, setting up the call for the member, thereby granting the member talker status, and notifying the number of members in the group that the member is granted talker status. The core network may be based on GSM or ANSI-41 technology.

Another aspect of the invention is directed to a method and system for providing group call service in a communication network that includes a core network and a CDMA radio access network. The method and system provide for broadcasting information to a number of members of the group for a predetermined time period, and repeating the broadcasting if at least one of the members of the group has responded to the information before the predetermined period of time expires. The predetermined time period may be replaced with a shorter predetermined time period if a predetermined number of members of the group have responded to the information before the predetermined period of time expires.

BRIEF DESCRIPTION OF THE DRAWINGS

FIG. 5 is a representation of an exemplary call setup procedure;

FIG. 6 is a representation of an exemplary immediate call set up procedure;

FIG. 8 is a representation of an exemplary call notification procedure;

FIG. 9 is a representation of an exemplary process of becoming a talker; and

FIG. 10 is a representation of an exemplary call termination procedure.

DETAILED DESCRIPTION

The CDMA system air interface is suitable for deployment in systems that are based on the ANSI-41 core network, as described in TIA/EIA/IS-2000, and GSM-MAP core networks, as described in the TIA/EIA/IS-833 standard entitled "Multi-Carrier Specification for Spread Spectrum Systems on GSM MAP (MC-MAP) (Lower Layers Air Interface)". In the case of the GSM-MAP core network, air interface connection management (CM), and mobility management (MM) procedures are defined by 3GPP specifications such as 3GPP TS 42.068 entitled "Voice Group Call Service (VGCS); Stage 1," 3GPP TS 42.069 entitled "Voice Group Call Service (VGCS); Stage 2," and GSM 04.18 entitled "Mobile radio interface layer 3 specification; Radio Resource Control Protocol". In the case of ANSI-41 core networks, the equivalent protocol is defined by 3GPP2 specifications, such as the MC-MAP standard defined in the TIA/EIA/IS-833 (MC-MAP). A CDMA system as referred to herein may include the family of CDMA systems, including CDMA2000, W-CDMA, and IS-95.

Figure 1:
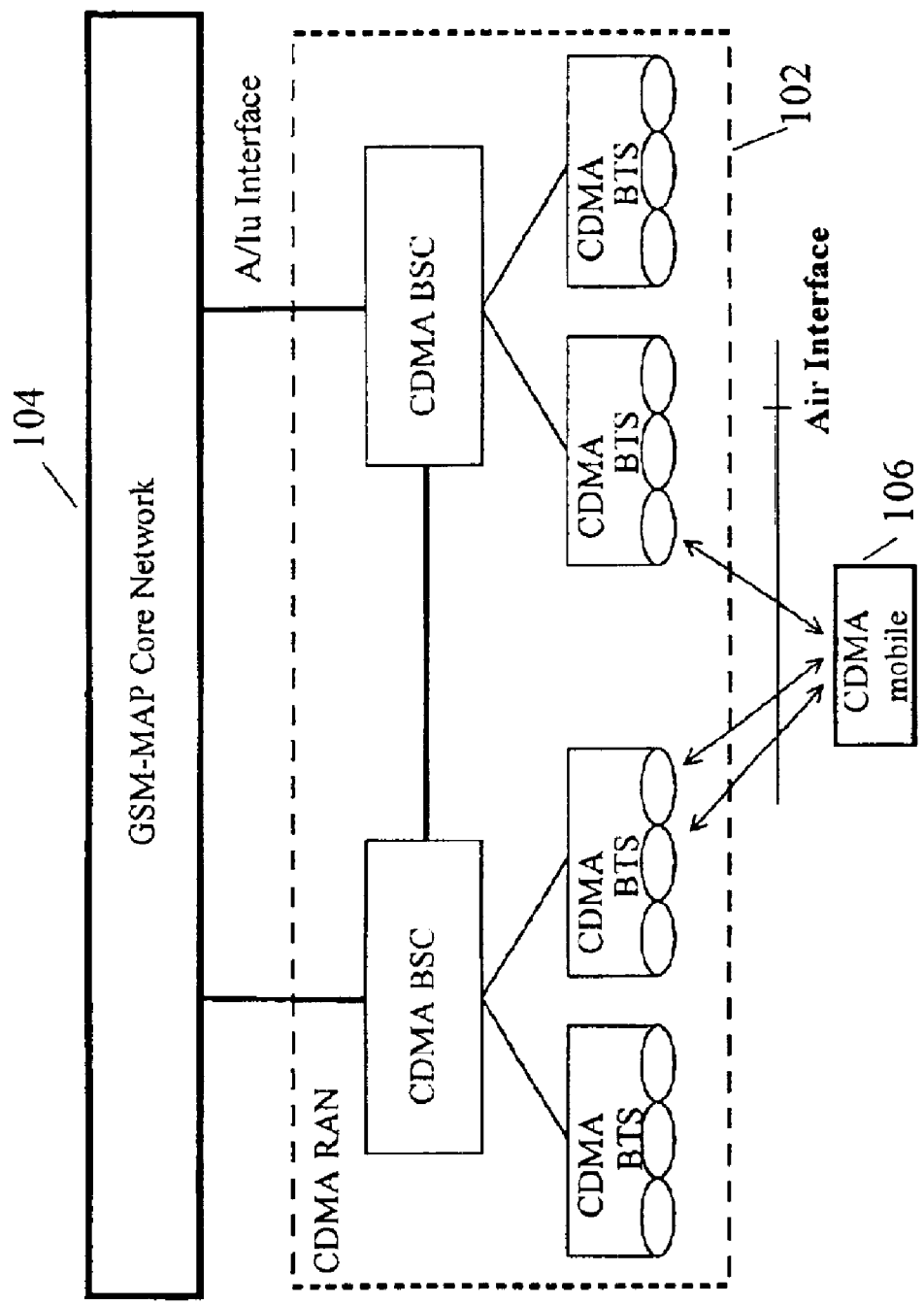
FIG. 1 is a representation of a CDMA radio access network over a core network architecture.

FIG. 1 shows an exemplary network architecture for the CDMA radio access network 102 in connection with the core network 104, which may include the GSM-MAP or ANSI-41 core network 104. The CDMA-MC mobiles 106 may support connection to the GSM-MAP or ANSI-41 core network 104, and may also support a subscriber identity module (SIM) or removable user identity module (R-UIM), as defined in the GSM 11.11 document entitled "Specification of the Subscriber Identity Module-Mobile Equipment (SIM-ME) Interface", 3GPP 21.111 document entitled "USIM and IC card requirements", and TIA/EIAIIS-820 document entitled "Removable User Identity Module for Spread Spectrum Systems."

Table 1 shows an exemplary MC-MAP protocol stack for GSM-CDMA signaling. There may be two groups of protocols in the GSM-MAP network 104. The first group is the non-access stratum (NAS) protocols that may terminate in the core network and may include functionality related to mobility management and service aspects of the system. The second group is the access stratum protocols that may terminate in the radio access network and may be responsible for the radio interface aspects of the system. In one embodiment, the CDMA protocol stack may play the role of the access stratum protocols, and may extend to support the GSM-MAP non-access stratum protocols, e.g. GSM RIL3 MM and CM, as defined in the 3GPP 24.008 document entitled "Mobile Radio Interface Layer 3 specification; Core Network Protocols; Stage 3" and in the 3GPP 24.007 document entitled "Mobile Radio Interface Signaling Layer 3-General Aspects."

TABLE 1

MC-MAP Protocol Stack

GSM L3 Connection Management (CM)
GSM L3 Mobility Management (MM)
CDMA MAP L3 Radio Resource Control (RRC)
CDMA LAC
CDMA MAC
CDMA L1

Figure 2:
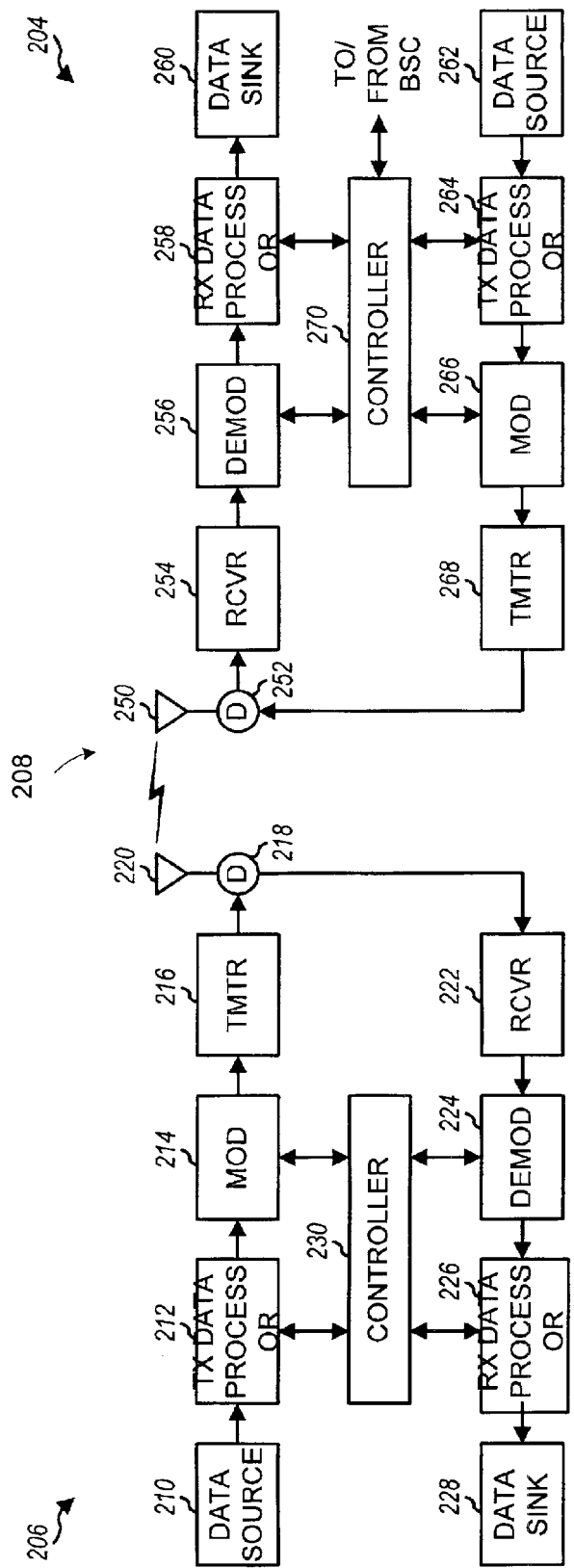
FIG. 2 shows an exemplary embodiment for a base station and a mobile station for the radio access network in FIG. 1.

FIG. 2 is a simplified block diagram of an embodiment of base station 204 and remote terminal 206, which are capable of implementing various aspects of the invention. For a particular communication, voice data, packet data, and/or messages may be exchanged between base station 204 and remote terminal 206, via an air interface 208. Various types of messages may be transmitted, such as messages used to establish a communication session between the base station and remote terminal and messages used to control a data transmission (e.g., power control, data rate information, acknowledgment, and so on). Some of these message types are described in further detail below.

For the reverse link, at remote terminal 206, voice and/or packet data (e.g., from a data source 210) and messages (e.g., from a controller 230) are provided to a transmit (TX) data processor 212, which formats and encodes the data and messages with one or more coding schemes to generate coded data. Each coding scheme may include any combination of cyclic redundancy check (CRC), convolutional, turbo, block, and other coding, or no coding at all. The voice data, packet data, and messages may be coded using different schemes, and different types of messages may be coded differently.

The coded data is then provided to a modulator (MOD) 214 and further processed (e.g., covered, spread with short PN sequences, and scrambled with a long PN sequence assigned to the user terminal). The modulated data is then provided to a transmitter unit (TMTR) 216 and conditioned (e.g., converted to one or more analog signals, amplified, filtered, and quadrature modulated) to generate a reverse link signal. The reverse link signal is routed through a duplexer (D) 218 and transmitted via an antenna 220 to base station 204.

At base station 204, the reverse link signal is received by an antenna 250, routed through a duplexer 252, and provided to a receiver unit (RCVR) 254. Receiver unit 254 conditions (e.g., filters, amplifies, down converts, and digitizes) the received signal and provides samples. A demodulator (DEMOD) 256 receives and processes (e.g., despreads, decovers, and pilot demodulates) the samples to provide recovered symbols. Demodulator 256 may implement a rake receiver that processes multiple instances of the received signal and generates combined symbols. A receive (RX) data processor 258 then decodes the symbols to recover the data and messages transmitted on the reverse link. The recovered voice/packet data is provided to a data sink 260 and the recovered messages may be provided to a controller 270. The processing by demodulator 256 and RX data processor 258 are complementary to that performed at remote terminal 206. Demodulator 256 and RX data processor 258 may further be operated to process multiple transmissions received via multiple channels, e.g., a reverse fundamental channel (R-FCH) and a reverse supplemental channel (R-SCH). Also, transmissions may be simultaneously from multiple remote terminals, each of which may be transmitting on a reverse fundamental channel, a reverse supplemental channel, or both.

On the forward link, at base station 204, voice and/or packet data (e.g., from a data source 262) and messages (e.g., from controller 270) are processed (e.g., formatted and encoded) by a transmit (TX) data processor 264, further processed (e.g., covered and spread) by a modulator (MOD) 266, and conditioned (e.g., converted to analog signals, amplified, filtered, and quadrature modulated) by a transmitter unit (TMTR) 268 to generate a forward link signal. The forward link signal is routed through duplexer 252 and transmitted via antenna 250 to remote terminal 206.

At remote terminal 206, the forward link signal is received by antenna 220, routed through duplexer 218, and provided to a receiver unit 222. Receiver unit 222 conditions (e.g., down converts, filters, amplifies, quadrature modulates, and digitizes) the received signal and provides samples. The samples are processed (e.g., despreaded, decovered, and pilot demodulated) by a demodulator 224 to provide symbols, and the symbols are further processed (e.g., decoded and checked) by a receive data processor 226 to recover the data and messages transmitted on the forward link. The recovered data is provided to a data sink 228, and the recovered messages may be provided to controller 230.

The group call service (GCS) may allow one user to talk to a group of users in a half-duplex or full-duplex mode. In the former case, because only one person may be permitted to talk at a time, the permission to talk may be moderated by the infrastructure. In such systems, a user may request permission to talk by pressing a "push-to-talk" button (PTT), for example. The system may arbitrate the requests received from multiple users and, through a contention-resolution process, the system may choose one of the requestors according to a predetermined algorithm. The system may then notify the chosen user that the user has permission to talk. The system may transparently dispatch the user's traffic information, such as voice and/or data, from the authorized talker to the rest of the group members, who may be considered "listeners." The voice and/or data traffic in GCS may be different from the classical one-to-one phone call, and a priority may be placed on some conversations.

Traffic and Signaling Channel Requirements During a Call

As mentioned before, the GCS may be half-duplex. Consequently, a user who is active in a GCS may not need to have simultaneously a forward link and a reverse link for the traffic. More precisely, the traffic channel requirements depend on the status of the user during the GCS, as a user may be exclusively a listener or a talker. Table 2 shows a representation of exemplary traffic channel requirements during a call in GCS.

TABLE 2

Traffic channel requirements during a call

| Direction | Talker | Other active users in the group |
|---|---|---|
| Forward link | No (for echo reason) | Yes |
| Reverse link | Yes | No |

Table 3 shows a representation of an exemplary set of signaling channel functions during a call in GCS, with respect to the user's status and the signaling link direction.

TABLE 3

Signaling channel functions during a call

| Direction | Talker | Other active users in the group |
|---|---|---|
| Forward link | Handover functions<br>Support GCS messages<br>Power control functions for the traffic reverse link | Handover functions<br>Support GCS messages |
| Reverse link | Support GCS messages | Support GCS messages<br>Possible broadcast channel power control |

Logical Channel Design

The signaling for the GCS has to be specific. On the forward link, two types of signaling, a point-to-point signaling and a point-to-many points signaling, may be provided. For example, the function "give reverse link status," which indicates to all the members of a group whether the reverse traffic link is free or busy, may use a point-to-many points signaling format. In one embodiment, there may be two ways of sending the same information to the members of a group. The first way is to send the same message independently to each target member on the member's point-to-point signaling link. For example, the message may be copied and sent on all the f-dsch channels. The second way is to send one message, which may be addressed to all the active mobile stations in the group. The second way is a new concept in the CDMA standards because it is not a broadcast message in its classical meaning. A classical broadcast message is addressed to any mobile in the system, but the group-broadcast may address only a subset of the system users who belong to a group. To support this new messaging concept, a new logical channel, the forward group-broadcast signaling channel f-(gb)sch, may be introduced. Table 4 shows an exemplary list of logical channels for traffic, according to one embodiment.

TABLE 4

Logical channel description

| Logical channel | Purpose |
|---|---|
| Broadcast traffic channel: Broad-tch | The base station may use this logical channel to send traffic to the active mobile stations within a group. |
| Reverse dedicated traffic channel: r-dtch | The mobile may use this logical channel to send traffic to the base station. |
| Forward group broadcast signaling channel: f-(gb)sch | The base station may use this logical channel to send signaling messages to all the users active in a group. |
| Forward/reverse dedicated signaling channel: f-dsch/r-dsch | These classical channels may be used for point-to-point signaling between the mobile station and the base station. |

In terms of resource management, the group-broadcast solution may be more efficient from a scalability perspective, but it may require some changes in the current CDMA standards. In one embodiment, defining two new logical channels, the f-(gb)sch for the signaling and the Broad-tch for the traffic, and introducing the new concept of "group addressing" may be required.

Table 5 shows an exemplary list of logical channels for signaling:

TABLE 5

Logical channels for signaling

| Direction | Talker | Other active users in the group |
|---|---|---|
| Forward link | f-dsch | f-(gb)sch and f-dsch<br>or<br>f-dsch |
| Reverse link | r-dsch | r-dsch |

Table 5 indicates two possible ways for signaling: a combination of the new channel f-(gb)sch and the classical channel f-dsch, or just the classical channel f-dsch. In the latter case, fewer changes in the CDMA standards may be required.

Figure 3:
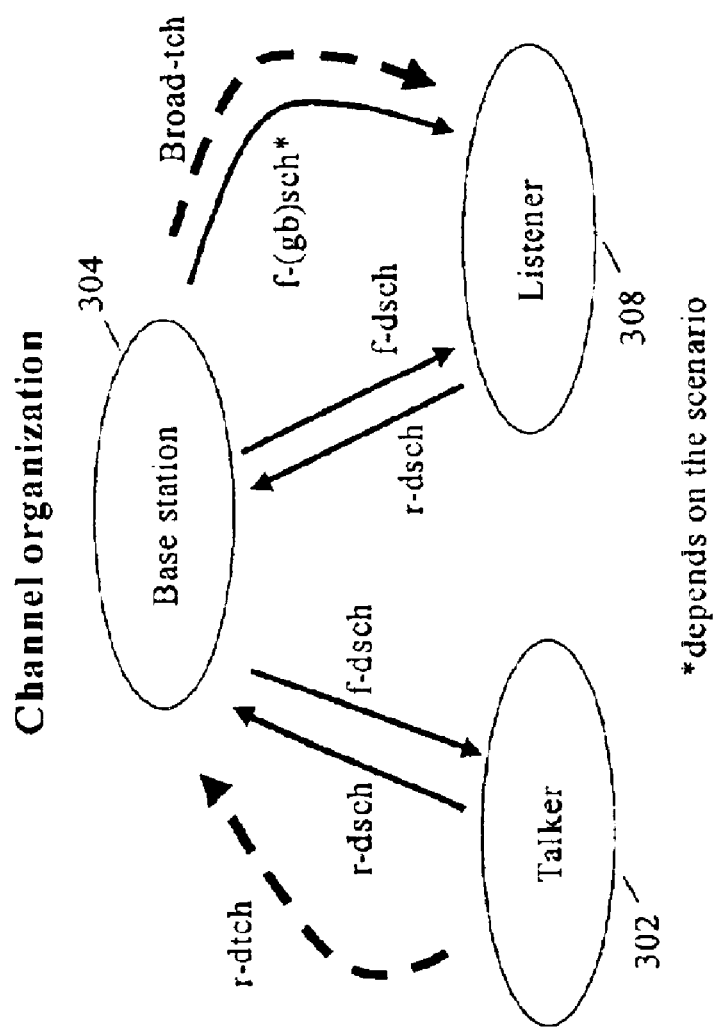
FIG. 3 is a representation of an exemplary logical channel organization.

FIG. 3 illustrates the logical channel organization during a GCS in accordance with an embodiment. In FIG. 3, the broken lines represent traffic channels, and the solid lines represent signaling channels. A talker 302 may be assigned r-dtch for the traffic, and r-dsch/f-dsch for the signaling. The base station 304 may use the broadcast traffic channel, Broad-tch, for broadcasting traffic to the members of a group 306, and the forward group broadcast signaling channel, f-(gb)sch, for broadcasting control signals to the members of the group 306. The base station may also use r-dsch/f-dsch channels for signaling with a member of the group.

Figure 4:
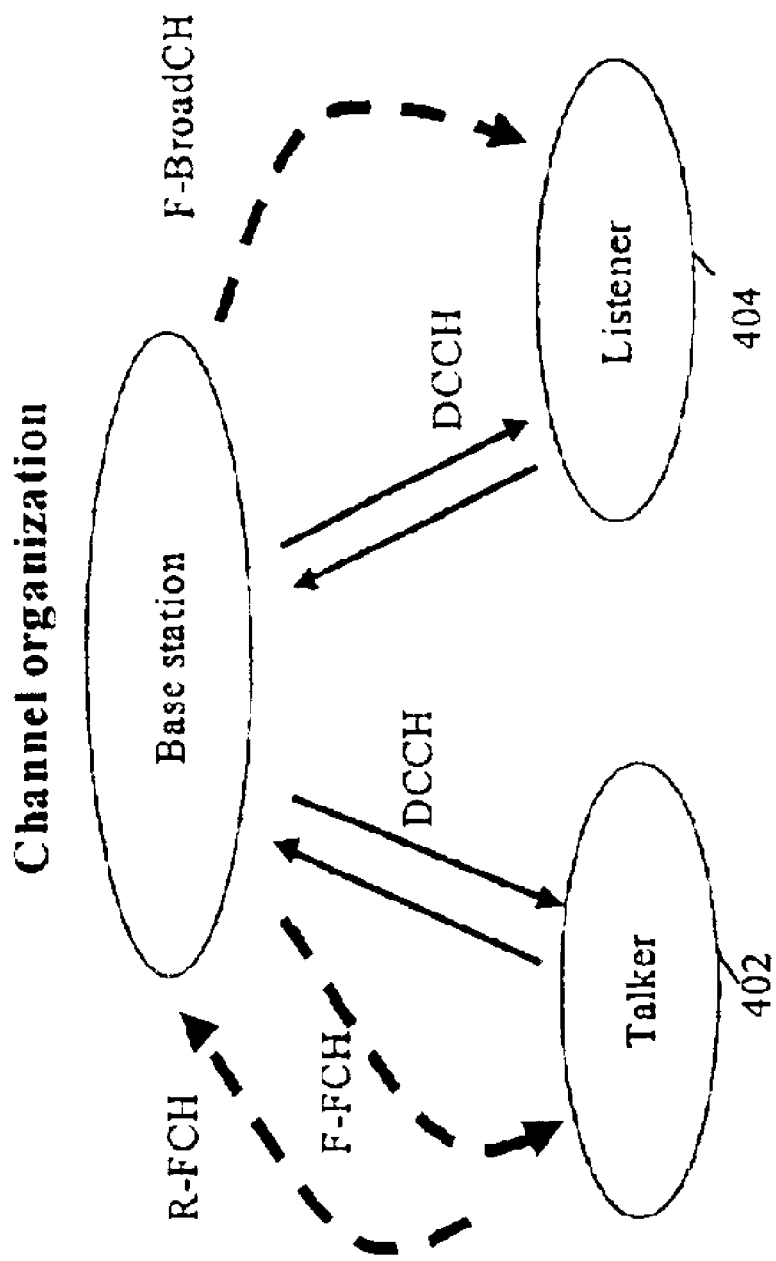
FIG. 4 is a representation of an exemplary physical channel organization.

Table 6 shows an exemplary mapping between the logical and physical channels, and FIG. 4 shows an exemplary organization of the physical channels. A group of mobile stations 404 may listen to a physical broadcast channel. In one embodiment, this channel may be the forward broadcast channel F-BroadCH, which may multiplex the group signaling and the forward traffic. In this way, the signaling and traffic load may be limited over the air, which may allow a more efficient use of the air resource when several members of a group are on the same channel during a GCS.

For the logical reverse dedicated traffic channel, r-dtch, a physical reverse fundamental channel, R-FCH may be used. Alternatively, the talker 402 may use only a reverse logical link for the traffic, but for the physical channel a forward fundamental channel may also be required in addition to the reverse fundamental channel. A power control function may be supported to power-control the R-FCH channel, by introducing the F-FCH channel for the talker 402.

For the forward and reverse dedicated signaling, the dedicated control channels, DCCH, may be used. The f-dsch/r-dsch channels combination may carry GCS messages and allow handover functions.

TABLE 6

Mapping between logical and physical channels

| Logical channel | Physical channel |
|---|---|
| Forward group broadcast signaling channel f-(gb)sch | F-BroadCH (forward broadcast channel) |
| Forward/reverse dedicated signaling channel f-dsch/r-dsch | DCCH (dedicated control channel) |
| Reverse dedicated traffic channel r-dtch | R-FCH (reverse fundamental channel) |
| Broadcast traffic channel Broad-tch | F-BroadCH (forward broadcast channel) |

In an alternative embodiment, the logical and physical signaling channels may be based on the common signaling channels, which may reduce the air interface resource consumption during the GCS. In one embodiment, the logical signaling channels, which are represented by the solid line in FIG. 3, i.e., the reverse and forward dedicated signaling channels (r-dsch and f-dsch), may be replaced with the reverse and forward common signaling channels (r-csch and f-csch), respectively. Accordingly, the physical signaling channels, which are represented by the solid lines in FIG. 4, i.e., the dedicated control channel (DCCH), may be replaced with the reverse enhanced access channel (R-EACH) for the reverse link, and with a shared signaling channel for the forward link. Table 7 shows an exemplary mapping between the logical channels and the physical channels according to an alternative embodiment. As shown in Table 7, the shared signaling channel may include the common control channel (F-CCCH), forward broadcast channel (F-BroadCH), and a forward broadcast signaling channel.

TABLE 7

Mapping between logical and physical channels

| Logical channel | Physical channel |
|---|---|
| Broadcast traffic channel Broad-tch | F-BroadCH (forward broadcast channel) |
| Forward group broadcast signaling channel f-(gb)sch | F-BroadCH (forward broadcast channel) |
| Reverse dedicated traffic channel r-dtch | A power controlled R-FCH (reverse fundamental channel) |
| Reverse common signaling channel r-csch | R-EACH (reverse enhanced access channel) |
| Forward common signaling channel f-csch | Shared Signaling Channels F-CCCH common control channel F-BroadCH (forward broadcast channel) F-Broad Signaling Channel (a broadcast channel for signaling, which may be used only for group call purpose) |

To support GCS in a CDMA radio network over the existing GSM-MAP or ANSI-41 core networks, the MC-MAP standard and the ANSI-41 standard may need to be modified, and the air interface, as it is currently defined in the TIA/EIA/IS-2000 and TIA/EIA/-IS-833 standards, may need to be enhanced. Table 8 shows a representation of an exemplary set of new messages and the corresponding functions that may be added to support GCS.

TABLE 8

New messages and their functions

| Message | Logical channel | Main functions |
|---|---|---|
| GCS Reverse link Status | f-dsch, f-csch, or f-(gb)sch | Give the reverse link status (free/busy) Can describe a power controlled R-FCH Can describe BroadCH |
| GCS Reverse Link Access | r-dsch or r-csch | Access the reverse link |
| GCS Reverse Link Grant | f-dsch or f-csch | Grant the reverse link |
| GCS Reverse Link Release | r-dsch/f-dsch or r-csch/f-csch | Release the reverse link |

GCS Reverse link Status: This message may indicate the status of the reverse link, free or busy, may describe to the listeners the R-FCH channel used for the talker's traffic, and may describe to the talker the physical broadcast channel. The logical channel assigned to this message may be f-(gb)sch, f-dsch, or f-csch.

GCS Reverse Link Access: A mobile station that wants to become a talker may request the reverse traffic channel by sending this message to the base station. The logical channel assigned to this message may be r-dsch or r-csch.

GCS Reverse Link Grant: The base station may send this message to the mobile station to authorize accessing the reverse traffic channel. The logical channel assigned to this message may be f-dsch or f-csch.

GCS Reverse Link Release: This message may be sent by the talker to indicate the release of the reverse link resource for traffic. This message may also be sent by the base station to command the talker to release the reverse link resource for traffic, for example, when the talker has been talking too long or another user of higher priority has requested to talk. The logical channel assigned to this message may be the r-dsch/f-dsch combination or the r-csch/f-csch combination.

Table 9 shows an exemplary set of GCS functions according to the user's status and the traffic link direction.

TABLE 9

GCS message functions during the call

| Direction | Talker | Other active users in the group |
|---|---|---|
| Forward link | Release reverse link | Give reverse link status Grant the reverse link |
| Reverse link | Release reverse link | Access the reverse link |

Call Flows

This section defines the adapted call flows to support the GCS. This section defines the call flows in the air interface part of the CDMA RAN 102 (FIG. 1), which may be placed in relation to the GSM-MAP or ANSI-41 core network 104 (FIG. 1) to give the overall protocol exchange with the core network. In the following, MS stands for mobile station and BS for base station. Table 10 shows an exemplary list of call flows in the air interface.

TABLE 10

Air interface call flow descriptions

| Table number | Title | Description |
|---|---|---|
| 5.1.1-0 | GCS CALL SETUP | It defines the signaling information required between the originator of the call and the base station in order to establish the group call when the GSM-MAP command called SETUP is used. |
| 5.1.2-0 | GCS IMMEDIATE CALL SETUP | It defines the signaling information required between the originator of the call and the base station in order to establish the group call when the GSM-MAP command called IMMEDIATE SETUP is used. |
| 5.1.3-0 | GCS NOTIFICATION BY PAGING | It defines the signaling information required between the base station and the members of a group in order to alert them and to connect them to the group call when a modified general page message is used. |
| 5.1.4-0 | GCS REVERSE LINK ACCESS AND RELEASE | It defines the signaling information required between the base station and a listener gaining access to the reverse link and releasing it after having talked. |
| 5.1.5-0 | GCS CALL TERMINATION | It defines the signaling information required between the originator of the group call and the base station in order to end the call session. |

FIG. 5 shows an exemplary GCS call establishment scheme using a setup command in accordance with an embodiment. In step 0, a requesting MS sends a request to a BS for a call setup. In step 1, the BS sends an extended channel assignment message (ECAM) message to the requesting MS, assigning the signaling and traffic channels. The traffic channel R-FCH may be power controlled. In Step 2, the requesting MS sends a service request message to the BS. After an authentication process is carried on in steps 3 and 4, in step 5, the requesting MS sends the Setup message to the BS. After the service connection messages are transmitted in steps 6 and 7, in step 8, the BS sends the connect message to the requesting MS, so that the requesting MS may conduct conversation as a talker. In step 9, the talker may send a "GCS reverse link release" message to the BS, and the BS may send a "GCS reverse link status" message to the MS, indicating the reverse link's status, e.g., that it is freed. The "GCS reverse link status" transmitted in step 10 may also include the broadcast channel description. While the GSM-MAP core network standard may support the call flows described above, the ANSI-41 standard may need to be modified to incorporate functionalities similar to the ones described above.

The ECAM message is described in the relevant CDMA standards, and may be modified to support the GCS, e.g., by adding a new assignment mode for ECAM. The requirements for the new assignment mode include the following:

1. ECAM may be able to give to listeners the description of the broadcast channel.

2. ECAM may be able to indicate a power controlled R-FCH to the originator of a call.

3. ECAM may be able to assign DCCH while giving the enhanced indications.

A new assignment mode, "GCS channel assignment" mode, may be added to the existing ECAM, as underlined in Table 11.

TABLE 11

| Value (binary) | Assignment Mode |
|---|---|
| 000 | Traffic Channel Assignment |
| 001 | Paging Channel Assignment |
| 010 | Acquire Analog System |
| 011 | Analog Voice Channel Assignment |
| 100 | Enhanced Traffic Channel Assignment |
| 101 | GCS Channel assignment |
| | All other values are reserved. |

FIG. 6 shows an exemplary GCS call establishment scheme, in accordance with an embodiment, using an immediate call setup command. It differs from the scheme of FIG. 5 in that the immediate call setup message may be sent to the BS before the authentication process, which may be carried out in steps 3 and 4.

Call Notification

Once the originator of a call in GCS has set up the call session, as discussed in the above exemplary embodiments, the network may notify the other mobile stations belonging to the group about the on-going call session. In one embodiment, there may be two ways to notify the members of the group: notifying each member individually or notifying the members as a group. Notifying each member individually is similar to the classical paging, i.e., the network may notify each member independently. The notification procedure may need to be more optimized than the classical paging procedure. Notifying the members as a group may use the same signaling for every member belonging to the group within a cell.

Figure 7:
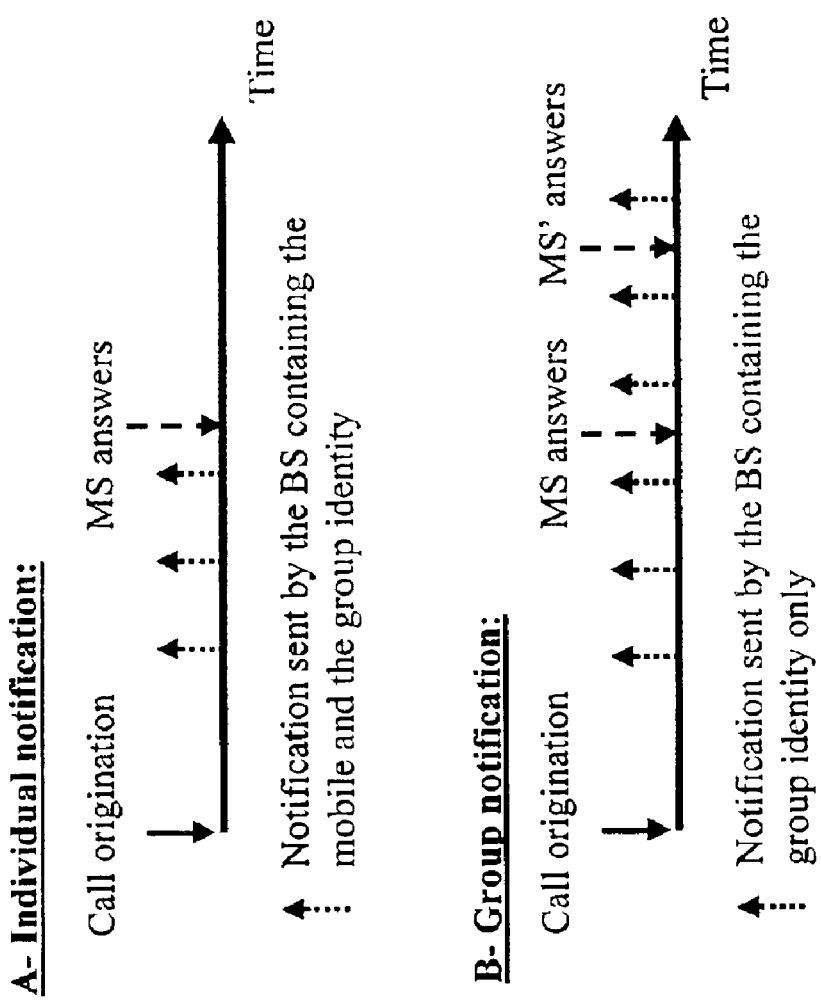
FIG. 7 is a representation of an exemplary set of call notification schemes.

FIG. 7, part A, shows an exemplary individual notification scheme in accordance with an embodiment. The BS may keep sending the notification to a target member until the member responds. The notification sent by the BS may contain the identity of the target member as well as the identity of the target group, which the target member belongs to. The individual notification may be stopped immediately after the target member has answered.

FIG. 7, part B, shows an exemplary group notification scheme in accordance with an embodiment. Even when one member answers, the base station may continue notifying the group because other members belonging to the group may join the call. In one embodiment, the BS may keep sending the notification to all members of a group until all or a predetermined number of members of the group have answered. In another embodiment, the BS may keep sending the notification to all members of the group for a predetermined period of time. The time period may start at the time the first group notification is sent. In one embodiment, the time period may restart at the time the first member answers. In another embodiment, the time period may restart each time a member answers, but the subsequent time period may become shorter and shorter every time a predetermined number of members have responded during a current predetermined time period. The notification sent by the BS may contain only the identity of the group, which the members belong to.

Table 12 shows a summary comparison between the individual and group notification schemes. For the individual notification scheme, a general message may be used and a record may be introduced in the message in order to carry the group identity. The group identity may be considered as some upper layer information that may be carried out by a paging message. In contrast, for the group notification scheme, a group address is required to distinguish the subset of users belonging to the group from the other users in the system. This may require introducing a group address in the LAC layer, which may require more changes in the CDMA standards than the individual notification does.

TABLE 12

Comparison between notification schemes

| Notification scheme | Advantage | Drawback |
|---|---|---|
| Individual | Close to the standard paging scheme<br>Can be optimized for delay constraint unlike classical paging procedure | Scalability problem<br>Group identity introduction in the message content<br>User scheduling adds more delay in the notification procedure |
| Group | Efficiency in the air resource use<br>Can be optimized for delay constraint unlike classical paging procedure | Group identity introduction in the message addressing<br>New procedure needs to be defined |

There may be several ways to support the notification schemes. The notification message may be on a non-primary broadcast control channel (non primary BCCH) and/or on an existing paging channel. The notification message may also be a modified paging message. However, using the existing paging channels may not require modifying the CDMA standards. Several paging modes are available; they may be slotted or non-slotted, and each may be based on quick paging or not. Table 13 shows a comparison of exemplary configurations that may be used for paging. A desirable configuration for a fast setup delay and reasonable battery consumption may be, according to Table 13, the non-slotted mode with quick paging.

TABLE 13

Paging features according to the different modes

|  | With quick paging | Without quick paging |
|---|---|---|
| Slotted | Standard paging time<br>Battery saving | Standard paging time<br>Standard consumption |
| Non-slotted | Fast paging<br>Battery saving | Fast paging<br>Standard consumption |

Table 14 shows an exemplary set of requirements for the individual and group notification schemes. In one embodiment may be to use an individual notification scheme with or without the introduction of the f-(gb)sch channel for the group signaling is used.

TABLE 14

Requirements according to the design choice

|  | Use of the f-(gb)sch | No use of the f-(gb)sch |
|---|---|---|
| Individual notification | Introduction of a new record for the group identity<br>A group address could be optionally used to send messages over the f-(gb)sch | Introduction of a new record for the group identity |
| Group notification | Introduction of the group address in the LAC<br>A group address could be optionally used to send messages over the f-(gb)sch | Introduction of the group address in the LAC |

According to one embodiment, the existing general page message may be modified to support the GCS. The individual notification scheme, as mentioned previously, is similar to classical paging, since the network may notify each mobile station independently. But this notification requires the introduction of a new record that contains the group identity. When a member of a group starts a call, a notified member may need to know which group is paging it, since the talker may belong to several groups. The notified member may need to determine the identity of the group notifying it in order to decide whether to accept the call or not.

Group notification schemes may require the introduction of a group address such that a one-to-one relationship between a group address and a group identity allows the notified member to determine the identity of each group. For example, a mobile station belonging to groups A and B, and receiving a notification containing the group address of group A, would know that a GCS is active for group A. In this case, the adaptation in the standards may require only some modifications in the LAC layer.

FIG. 8 shows an exemplary GCS call notification scheme, in accordance with an embodiment, using the classical paging scheme. In step 0, the BS sends a group page message, which may contain the target group identity, to the MSs in the target group, notifying them about the ongoing call. In step 1, an MS may send a connection request to the BS, requesting a physical channel to be connected to the GCS as a listener. In step 2, the BS may send an ECAM message to the requesting MS, assigning the signaling and traffic channels. The traffic channel R-FCH may be power-controlled. In step 3, in response to the general paging message received in step 0, the requesting MS may send a paging response to the BS. In steps 4 and 5, the service is connected and acknowledged by the MS.

FIG. 9 shows an exemplary process, in accordance with an embodiment, for becoming a talker during an ongoing call session. In step 0, the BS may send the "GCS reverse link status" message to the MSs in a group, indicating that the reverse link is free. This message may contain a reverse traffic channel description. In step 1, a requesting MS may send a "GCS reverse link access" to the BS, requesting to become a talker. In step 2, the BS may send a "GCS reverse link grant" message to the requesting MS, granting the MS permission to become a talker, and the MS may acknowledge the permission, in step 3. Consequently, the requesting MS may conduct conversation as a talker. In step 4, the talker may send a "GCS reverse link release" message to the BS, and the BS may send a "GCS reverse link status" message to the MS in step 5, indicating that the reverse link is freed. The "GCS reverse link status" may also include broadcast channel description.

FIG. 10 shows an exemplary process for terminating a GCS call session in accordance with an embodiment. In step 0, the MS that originated the GCS call may request the BS to terminate the call session, e.g., by sending a "termination" request message. In step 1, the BS may send the termination message to the requesting MS, which concludes the session after "release order" transactions are carried out in steps 2 and 3.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The word "exemplary" is used exclusively herein to mean "serving as an example, instance, or illustration." Any embodiment described herein as "exemplary" is not necessarily to be construed as preferred or advantageous over other embodiments.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for sending information to a number of members of a group in a communication network comprising a core network and a CDMA radio access network, the method comprising:

broadcasting the information to the number of members of the group for a predetermined time period; and repeating the broadcasting if at least one of the members of the group has responded to the information before the predetermined period of time expires, wherein the predetermined time period is replaced with a shorter predetermined time period if a predetermined number of members of the group have responded to the information before the predetermined period of time expires.

2. The method of claim 1 wherein the core network is based on GSM technology.

3. The method of claim 1 wherein the core network is based on ANSI-41 technology.

4. An apparatus for sending information to a number of members of a group in a communication network comprising a core network and a CDMA radio access network, the apparatus comprising:

means for broadcasting the information to the number of members of the group for a predetermined time period; and means for repeating the broadcasting if at least one of the members of the group has responded to the information before the predetermined period of time expires, wherein the predetermined time period is replaced with a shorter predetermined time period if a predetermined number of members of the group have responded to the information before the predetermined period of time expires.

5. The apparatus of claim 4 wherein the core network is based on GSM technology.

6. The apparatus of claim 4 wherein the core network is based on ANSI-41 technology.

7. An apparatus for sending information to a number of members of a group in a communication network comprising a core network and a CDMA radio access network, the apparatus comprising:

a transmitter adapted to broadcast the information to the number of members of the group for a predetermined time period; and a processor adapted to repeat the broadcasting if at least one of the members of the group has responded to the information before the predetermined period of time expires, wherein the predetermined time period is replaced with a shorter predetermined time period if a predetermined number of members of the group have responded to the information before the predetermined period of time expires.

8. The apparatus of claim 7 wherein the core network is based on GSM technology.

9. The apparatus of claim 7 wherein the core network is based on ANSI-41 technology.

* * * * *